United States Patent [19]

Rohrs et al.

[11] 4,084,713
[45] Apr. 18, 1978

[54] VEHICLE WHEELCHAIR RAMP

[75] Inventors: Donald L. Rohrs; Harold A. Downing; Donald L. Collins, all of Hutchinson, Kans.

[73] Assignee: Collins Industries, Inc., Hutchinson, Kans.

[21] Appl. No.: 682,387

[22] Filed: May 3, 1976

[51] Int. Cl.² .............................................. B60P 1/00
[52] U.S. Cl. ........................................ 214/85; 14/69.5
[58] Field of Search .................. 214/85, 85.1; 14/69.5; 280/164 A; 187/8.52; 292/128, 228; 296/57 A

[56] References Cited

U.S. PATENT DOCUMENTS

| 1,843,500 | 2/1932 | Appelt | 280/164 A |
| 2,793,894 | 5/1957 | Modes | 292/128 |
| 3,176,334 | 4/1965 | Lovdahl | 14/71.1 |
| 3,352,440 | 11/1967 | Wilson | 214/85 |
| 3,549,030 | 12/1970 | Coughran, Jr. | 214/85 |
| 3,651,965 | 3/1972 | Simonelli et al. | 214/85 |
| 3,804,206 | 4/1974 | Bubik | 187/8.52 |
| 3,874,527 | 4/1975 | Royce | 214/85 |
| 3,901,398 | 8/1975 | Bunch | 214/85 |

Primary Examiner—Robert J. Spar
Assistant Examiner—Lawrence E. Williams
Attorney, Agent, or Firm—Edwin H. Crabtree; John H. Widdowson

[57] ABSTRACT

A vehicle wheelchair ramp for loading and unloading an occupant confined to a wheelchair. The ramp is hingably mounted on the floor of the vehicle and unfolds outwardly from the vehicle for contacting the ground surface, curb, or the like. The ramp includes built-in steps with U-shaped guide channels positioned adjacent both sides of the steps for guiding the wheelchair as a wheelchair attendant uses the steps for loading and unloading the occupant in the wheelchair.

4 Claims, 5 Drawing Figures

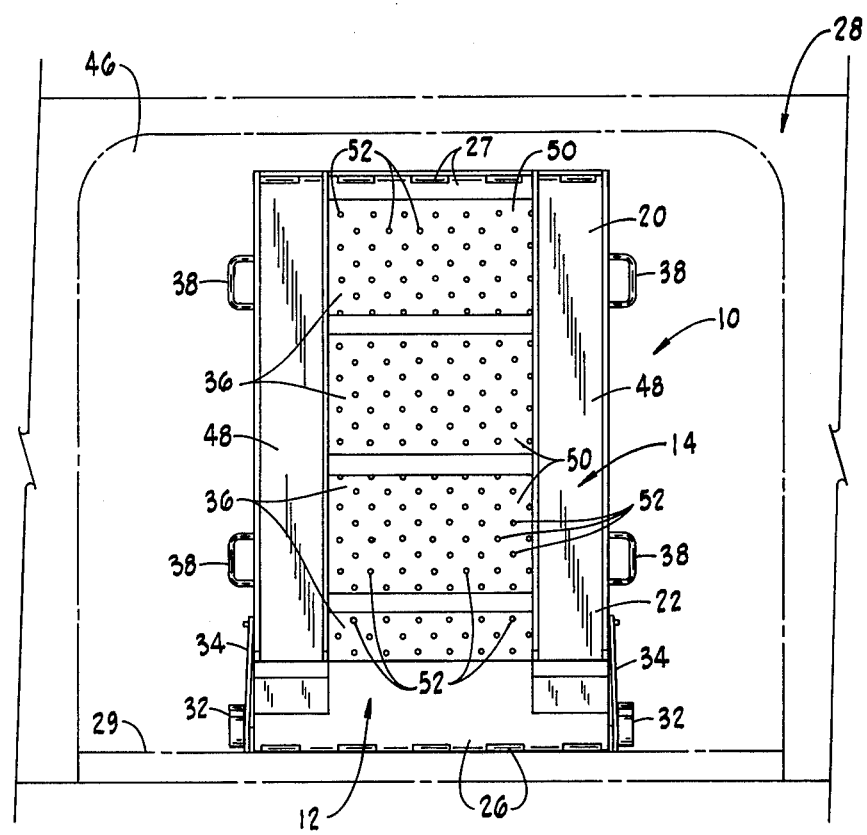
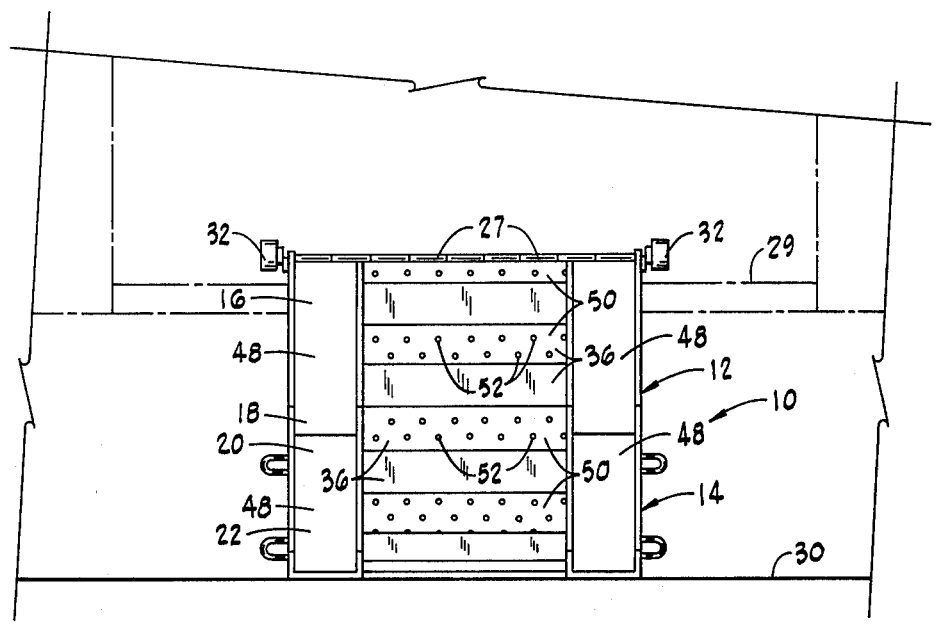

VEHICLE WHEELCHAIR RAMP

BACKGROUND OF THE INVENTION

This invention relates generally to ramps and more particularly but not by way of limitation to a foldable ramp mounted in a vehicle.

Heretofore there have been various types of ramps and loading platforms used for servicing airplanes, vehicles, or the like. These ramps and platforms are mounted on the ground surface and position adjacent the airplane or vehicle. In some instances the ramps or platforms ar unfolded from the airplane or vehicle.

None of the prior art ramps or platforms are similar to the subject invention nor do they provide the advantages of the subject ramp for use in transporting the handicapped confined to a wheelchair.

SUMMARY OF THE INVENTION

The subject invention is made of a light weight metal such as aluminum, yet is strong enough to hold the heaviest wheelchair with a confined occupant and a wheelchair attendant.

The ramp includes U-shaped channels for guiding the wheels of the wheelchair therein to prevent the wheels from skidding off the ramp.

The ramp provides built-in, non-slip, pierced aluminum steps to aid the wheelchair attendant while loading and unloading the occupant in the wheelchair.

When the ramp is unfolded from the vehicle because of its hinged construction the angle of incline of the ramp can be adjusted so that the ramp can be placed on the ground surface, curb, or any other raised surface.

The ramp is completely retractable into the vehicle. When the ramp is retracted, it is folded into a vertical position in the vehicle taking up a minimum of floor space area.

The ramp is spring biased to aid the wheelchair attendant in folding the ramp into the retracted position in the vehicle.

The invention includes safety features such as a hinge latch to prevent the ramp from unfolding when the vehicle's door is open. Also a ramp latch is included for securing a first and second ramp member together when the ramp members are folded in the retracted position in the vehicle.

The vehicle wheelchair ramp includes a first ramp member having a first end portion and second end portion. The first end portion of the first ramp member is hingeably mounted to the floor of the vehicle. A second ramp member having a first end portion and a second end portion is hingeably mounted to the second end portion of the first ramp member. The first and second ramp members include U-shaped guide channels positioned along their lengths for guiding the wheels of the wheelchair. Positioned between the guide channels are built-in steps having a series of apertures pierced therein for providing a non-slip surface on the steps.

The advantages and objects of the invention will become evident from the following detailed description when read in conjunction with the accompanying drawings which illustrate the preferred embodiments of the invention.

BRIEF DESCRIPTION OF THE DRAWINGS

FIG. 2 is a front view of the ramp in a retracted position in the vehicle.

FIG. 5 is a side sectional view similar to FIG. 4 but with the ramp in an unfolded position.

DETAILED DESCRIPTION OF THE DRAWINGS

Figure 1:
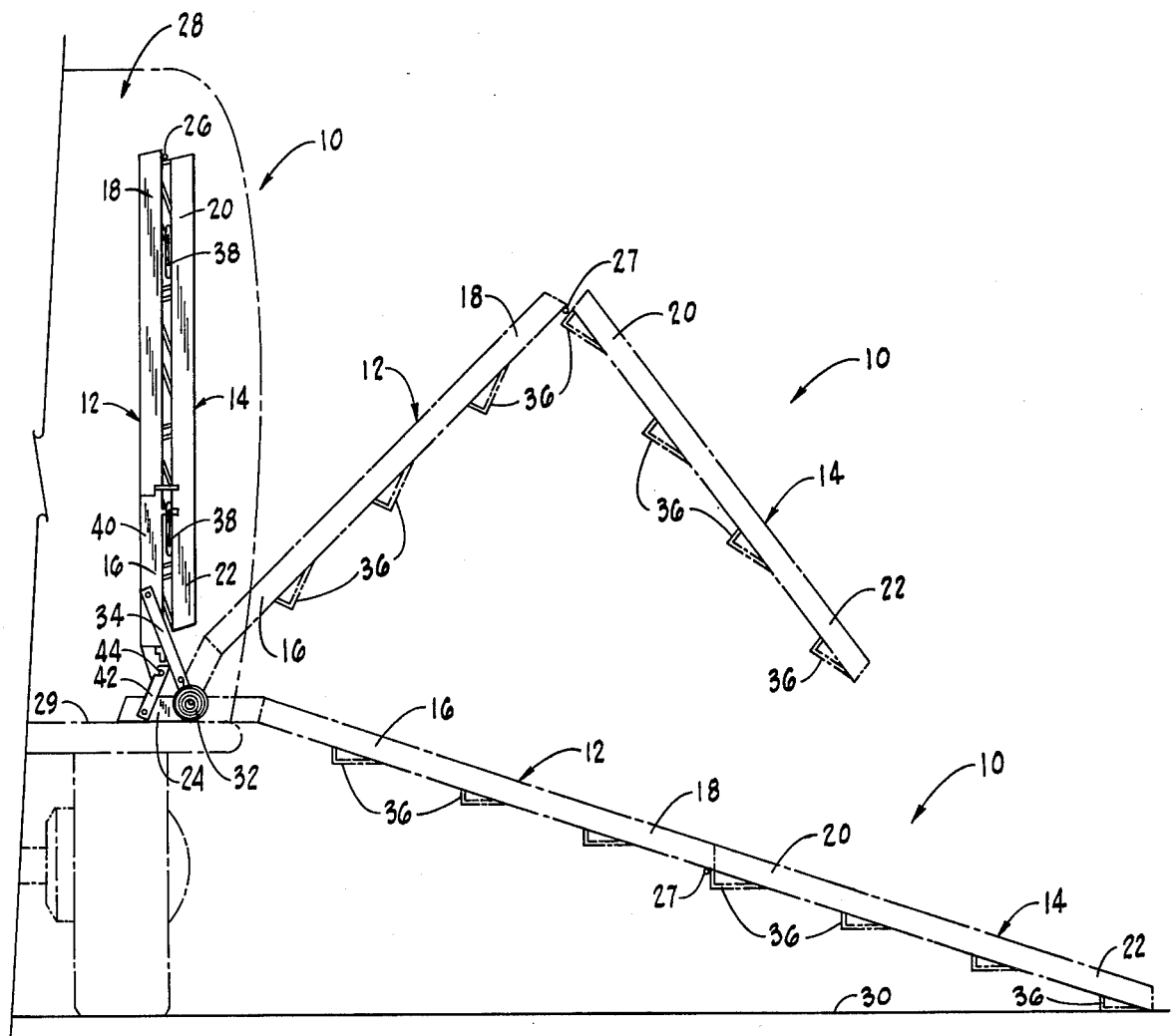
FIG. 1 is a side view of the ramp in a retracted position in the vehicle. Also shown in dotted lines is the ramp in a semi-unfolded position and an unfolded position contacting the ground surface.

In FIG. 1 the ramp is designated by general reference numeral 10. The ramp 10 includes a first ramp member 12 and a second ramp member 14. The first ramp member 12 includes a first end portion 16 and a second end portion 18. The second ramp member 14 includes a first end portion 20 and a second end portion 22. The first end portion 16 of the first ramp member 12 is attached to a ramp base 24 by a hinge 26 shown in FIG. 2. The second end portion 18 of the first ramp member 12 is attached to the first end portion 20 of the second ramp member 14 by a hinge 27.

In this view the ramp 10 is shown in a retracted position inside a vehicle 28 with the first ramp member 12 and second ramp member 14 folded in a vertical position and disposed adjacent and parallel to each other. The ramp base 24 is mounted on a floor 29 of the vehicle 28.

The ramp 10 is shown in dotted lines in a semi-unfolded position as the first and second ramp members 12 and 14 are pulled outwardly and downwardly from the vehicle 28. The ramp 10 is also shown in dotted lines in a completely unfolded position wherein the second end portion 22 of the second ramp member 14 is now bearing on a ground surface 30.

When it is desired to retract the ramp 10 the first and second ramp members 12 and 14 are folded upwardly and inwardly toward the vehicle 28. The retraction of the ramp 10 into the vehicle 28 is aided by coil springs 32 mounted on the ramp base 24 and attached to pivot arms 34. The pivot arms 34 are positioned on opposite sides of the first end portion 16 of the first ramp member 12 and slidably attached thereto. Through the use of the coil torsion springs 32, the ramp 10 is biased toward the retracted position inside the vehicle 28 thereby aiding the wheelchair attendant in folding the ramp members 12 and 14 into the vehicle 28.

A portion of built-in steps 36 are shown in FIG. 1. The built-in steps 36 are disposed along the length of the first and second ramp members 12 and 14. The steps 36 are used by the wheelchair attendant in climbing up or down the ramp 10 while loading or unloading the occupant in the wheelchair. It should be noted that the steps 36 are positioned on the first and second ramp members 12 and 14 so that when the second ramp member 14 is folded into the first ramp member 12 and the ramp 10 is retracted into the vehicle 28, the lower portion of the steps 36 in the first ramp member 12 mate with the upper portion of the steps 36 in the second ramp member 14 thereby allowing the ramp members 12 and 14 to be disposed adjacent and parallel to each other inside the vehicle 28.

Also shown in FIG. 1 are ramp handles 38 which are disposed on opposite sides of the second ramp member 14. The second ramp member 14 is held in place inside the vehicle 28 and adjacent the first ramp member 12 by ramp latches 40 which are slidably attached to the first ramp member 12 and engage the handles 38 when the ramp 10 is in its retracted position in the vehicle 28. Also the ramp 10 is prevented from swinging outward on hinge 26 when the vehicle door is opened by hinge latches 42 which releasably engage latch pins 44. The latch pins 44 are mounted on the sides of the first end portion 16 of the first ramp member 14. The ramp latches 40 and the hinge latches 42 will be discussed in greater detail under the discussion of FIG. 4 and FIG. 5.

In FIG. 2 a front view of the ramp 10 can be seen folded into a retracted position inside a door 46 of the vehicle 28. In this view the second ramp member 14 which is substantially identical to the first ramp member 12 is shown with U-shaped channels 48 positioned along the length of the second ramp member 14 and disposed on each side of the ramp member 14. The U-shaped channels 48 are substantially wide enough for receiving the wheels of wheelchairs having various widths and providing a guide for the wheels as the wheelchair is loaded and unloaded on the ramp 10. Also the U-shaped channels 48 prevent the wheels from slipping off the sides of the first and second ramp members 12 and 14.

Disposed between the U-shaped channels 48 are the steps 36. A horizontal portion 50 of the steps 36, the portion 50 being horizontal when the ramp 10 is unfolded and ready for use, includes a series of equally spaced apertures 52 which are pierced through the metal surface upwardly providing a non-slip surface to aid the wheelchair attendant in climbing the steps 36. The ramp 10 while it can be made of various types of materials or metals, is preferably made of aluminum to provide the ramp 10 with a lightweight but rugged structure.

Figures 3, 4:
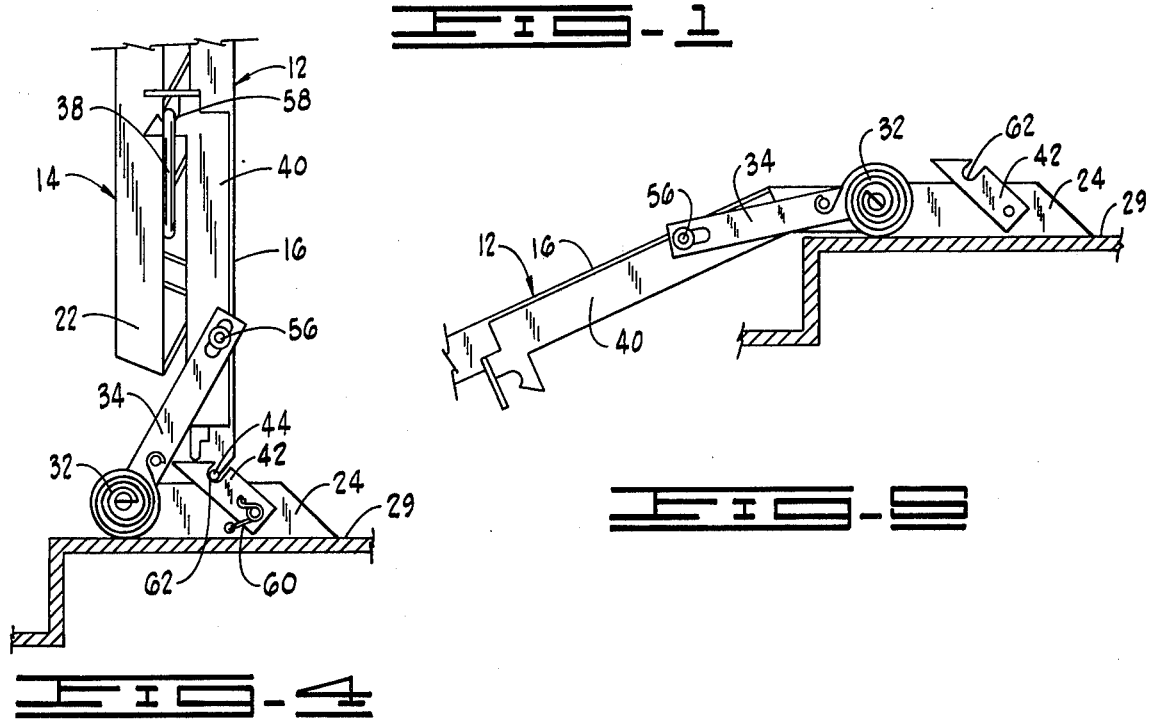
FIG. 3 is a front view of the ramp in an unfolded position contacting the ground surface.
FIG. 4 is a side sectional view of the retracted ramp illustrating the ramp latch and the hinge latch.

In operation the vehicle 28 is stopped and the door 46 is opened exposing the ramp 10 disposed in a retracted vertical position inside the vehicle 28. The wheelchair attendant releases the ramp latches 40 from the handles 38 thereby allowing the second ramp member 14 to be unfolded from the first ramp member 12. After the ramp latches 40 are released, the hinge latches 42 which are attached to the first ramp member 12 are then released. At this point the ramp 10 is ready to be unfolded from the vehicle 28. By grasping the handles 38 the first ramp member 12 and second ramp member 14 are unfolded as shown in FIG. 1 until the second end portion 22 of the second ramp member 14 contacts the ground surface. Because of the ramp 10 being attached to the ramp base 24 by hinge 26, the angle of incline of the ramp can be easily adjusted so that the second end portion 22 of the second ramp member 14 can also be placed on a curb or any other surface above the ground. When the ramp 10 is completely unfolded as shown in FIG. 3 the occupant in the wheelchair is ready to be unloaded or loaded into the vehicle. For example assume the wheelchair occupant is ready for being loaded into the vehicle 28. The wheelchair attendant guides the wheelchair up to the second end portion 22 of the second ramp member 14. Through the use of the U-shaped channels 48 positioned on both sides of the first and second ramp members 12 and 14, the wheels of the wheelchair are guided up the ramp and into the vehicle 28. As the wheelchair attendant guides the occupant in the wheelchair up the ramp 10 and into the vehicle 28, the attendant uses the steps 36 to climb the ramp 10.

When the wheelchair attendant has safely secured the wheelchair occupant in the vehicle 28, the attendant walks down the ramp steps 36 and folds the first and second ramp members 12 and 14 upwardly and inwardly into the door 46 of the vehicle 28. As the ramp 10 is folded into the retracted position in the vehicle 28, the attendant is aided by the coil springs 32 mounted to the ramp base 24 and attached to the first ramp member 16 which is biased toward the retracted position in the vehicle 28. When the first and second ramp members 12 and 14 are folded vertically in the vehicle 28 the ramp latches 40 are attached to the handles 38 and the hinge latches 42 are attached to the latch pins 44 thereby securing the ramp 10 inside the vehicle 28.

In FIG. 4 a sectional side view of the ramp 10 is seen in its retracted position and illustrating in greater detail the hinge latch 42 and the ramp latch 40. Also seen in this view in detail is the coil spring 32 attached to the ramp base 24 and the pivot arm 34. The pivot arm 34 is slidably attached to a pivot pin 56 which is mounted to the sides of the first end portion 16 of the first ramp member 12.

In this view the ramp latch 40 which is slidably attached to the sides of the first end portion 16 of the first ramp member 12 is shown including a U-shaped end portion 58 which slidably engages a portion of the handle 38. In this view the U-shaped end portion 58 is seen engaging the handle 38. By sliding the latch 40 downwardly the handle 38 is released thereby disengaging the second ramp member 14 from the first ramp member 12.

The hinge latch 42 is shown biased upwardly in a clockwise direction by a spring 60. The hinge latch 42 is seen having a U-shaped portion 62 engaging the latch pin 44, thereby securing the first ramp member 12 to the ramp base 24 and preventing the ramp 10 from being unfolded from the vehicle 28. By moving the hinge latch 42 downwardly the U-shaped portion 62 is disengaged from the latch pin 44. The ramp 10 can now be moved outwardly and downwardly on the hinge 26.

In FIG. 5 a sectional side view of the ramp base 24 and the first end portion 16 of the first ramp member 12 is shown with the first ramp member 12 in an unfolded position. In this view the hinge latch 42 has been released from the latch pin 44 and the ramp latch 40 has been released from the handle 38 and the first and second ramp members 12 and 14 have moved outwardly and downwardly from the vehicle 28. The pivot arm 34 which is attached to the coil spring 32 and the pivot pin 56 has rotated in a counterclockwise direction thereby compressing the coil spring 32. When the ramp 10 is ready to be folded and retracted into the vehicle 28 the coil spring 32 will bias the pivot arm 34 upwardly in a clockwise direction thereby aiding the wheelchair attendant in folding the first and second ramp members 12 and 14 into the vehicle 28.

Changes may be made in the construction and arrangement of the parts or elements of the embodiment as disclosed herein without departing from the spirit or scope of the invention as defined in the following claims.

I claim:

1. A vehicle wheelchair ramp for loading and unloading an occupant confined to a wheelchair, the ramp comprising:

a first ramp member having a first end portion and a second end portion, the first end portion hingeably mounted to a ramp base mounted on the floor of the vehicle;

a second ramp member having a first end portion and a second end portion, the first end portion of said second ramp member hingeably mounted to the second end portion of said first ramp member, the second end portion of said second ramp member contacting the ground surface, curb, or the like, when the ramp is unfolded from the vehicle, said first ramp member and said second ramp member folded together and retracted into the vehicle and positioned parallel and adjacent to each other in a vertical position inside the vehicle, said second ramp member including handles mounted on the sides thereof to aid in unfolding the ramp from the vehicle; said first and second ramp members including the following:

"U" shaped guide channels positioned along the length thereof and adjacent the side for guiding the wheels of the wheelchair therein; and built-in steps positioned along the length thereof and between said guide channels for use by a wheelchair attendant during the loading and unloading of the occupant in the wheelchair, said steps including a series of apertures pierced therein for providing non-slip steps; and a coil spring attached to said ramp base and a pivot arm, said pivot arm slidably attached to a pivot pin mounted to the side of the first end portion of said first ramp member, said coil spring biasing said pivot arm upwardly for pivoting the ramp into a retracted position in the vehicle.

2. The ramp as described in claim 1, further including a spring biased hinge latch mounted on said ramp base, said hinge latch having a "U" shaped portion for releasably engaging a latch pin attached to the first end portion of said first ramp member for securing the ramp in a retracted position in the vehicle prior to using the ramp.

3. A vehicle wheelchair ramp for loading and unloading an occupant confined to a wheelchair, the ramp comprising:
a first ramp member having a first end portion and a second end portion, the first end portion hingeably mounted to a ramp base mounted on the floor of the vehicle;

a second ramp member having a first end portion and a second end portion, the first end portion of said second ramp member hingeably mounted to the second end portion of said first ramp member, the second end portion of said second ramp member contacting the ground surface, curb, or the like, when the ramp is unfolded from the vehicle, said first ramp member and said second ramp member folded together and retracted into the vehicle and positioned parallel and adjacent to each other in a vertical position inside the vehicle, said second ramp member including handles mounted on the sides thereof to aid in unfolding the ramp from the vehicle;

said first and second ramp members including the following:

"U" shaped guide channels positioned along the length thereof and adjacent the side for guiding the wheels of the wheelchair therein; and built-in steps positioned along the length thereof and between said guide channels for use by a wheelchair attendant during the loading and unloading of the occupant in the wheelchair, said steps including a series of apertures pierced therein for providing non-slip steps; and a ramp latch slidably attached to said first ramp member, said ramp latch including a "U" shaped end portion for releasably engaging a portion of one of said handles of said second ramp member for securing said first and second ramp members together when the ramp is retracted in a vertical position in the vehicle prior to using the ramp.

4. The ramp as described in claim 3, further including a spring biased hinge latch mounted on said ramp base, said hinge latch having a "U" shaped portion for releasably engaging a latch pin attached to the first end portion of said first ramp member for securing the ramp in a retracted position in the vehicle prior to using the ramp.

* * * * *